United States Patent
Wasilewski

(10) Patent No.: US 6,187,085 B1
(45) Date of Patent: Feb. 13, 2001

(54) CARBON BLACK CONCENTRATES FOR NEWS INK

(75) Inventor: Olgierd Wasilewski, Edison, NJ (US)

(73) Assignee: Sun Chemical Corporation, Fort Lee, NJ (US)

(*) Notice: Under 35 U.S.C. 154(b), the term of this patent shall be extended for 0 days.

(21) Appl. No.: 09/360,429

(22) Filed: Jul. 26, 1999

(51) Int. Cl.$^7$ .......................... C09D 11/02; C09D 201/00
(52) U.S. Cl. ..................... 106/31.75; 106/31.88; 106/31.9; 106/285; 106/477
(58) Field of Search .................. 106/31.75, 31.9, 106/31.88, 285, 477

(56) References Cited

U.S. PATENT DOCUMENTS

| | | | |
|---|---|---|---|
| 3,300,673 | 1/1967 | Curtis et al. | 313/153 |
| 4,747,964 | 5/1988 | Durand et al. | 252/51.5 A |
| 5,954,866 | * 9/1999 | Ohta et al. | 106/31.89 |
| 6,096,125 | * 8/2000 | Breton et al. | 106/31.75 |

FOREIGN PATENT DOCUMENTS 3-134073 * 6/1991 (JP).
6-256698 * 9/1994 (JP).

OTHER PUBLICATIONS

Derwent abstract of JP03/134073, Jun. 1991.*
Derwent abstract of JP06/256698, Sep. 1994.*
Forbes, E.S.. and Neustrader E.L., "The Mechanism of Action of Polyisobutenyl Succinimide LubricatingOil Additives", Tribology, Apr. 1972, pp 72–77.

* cited by examiner

Primary Examiner—Helene Klemanski
(74) Attorney, Agent, or Firm—Sidney Persley

(57) ABSTRACT

A printing ink composition is described which includes carbon black and an alkali metal hydroxide in combination with an alkenyl succinimide for the dispersion of the carbon black. Also disclosed is a method of preparing a carbon black printing ink composition which comprises dispersing the carbon black in a mineral oil in the presence of an alkali metal hydroxide and an alkenyl succinimide.

21 Claims, 6 Drawing Sheets

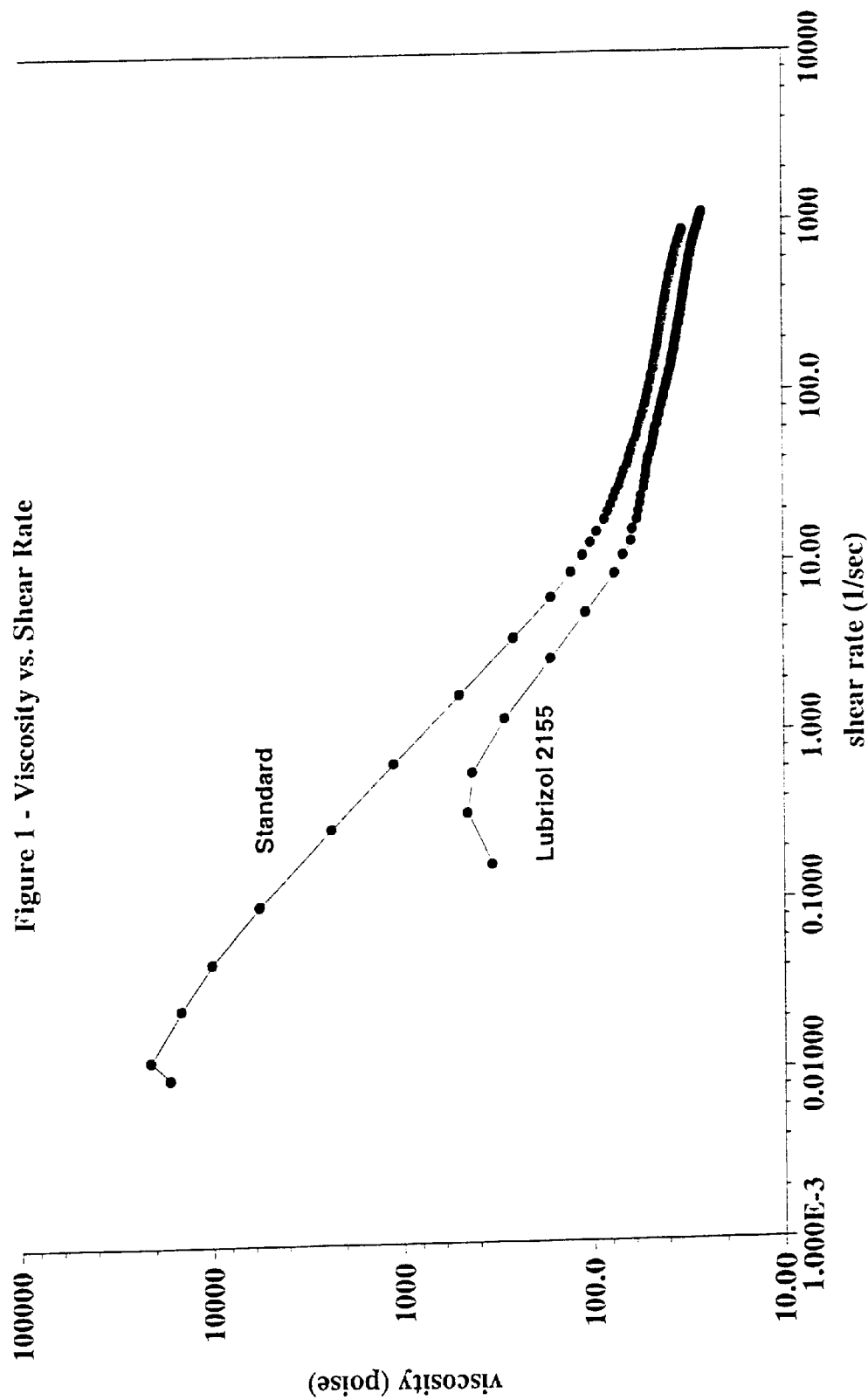

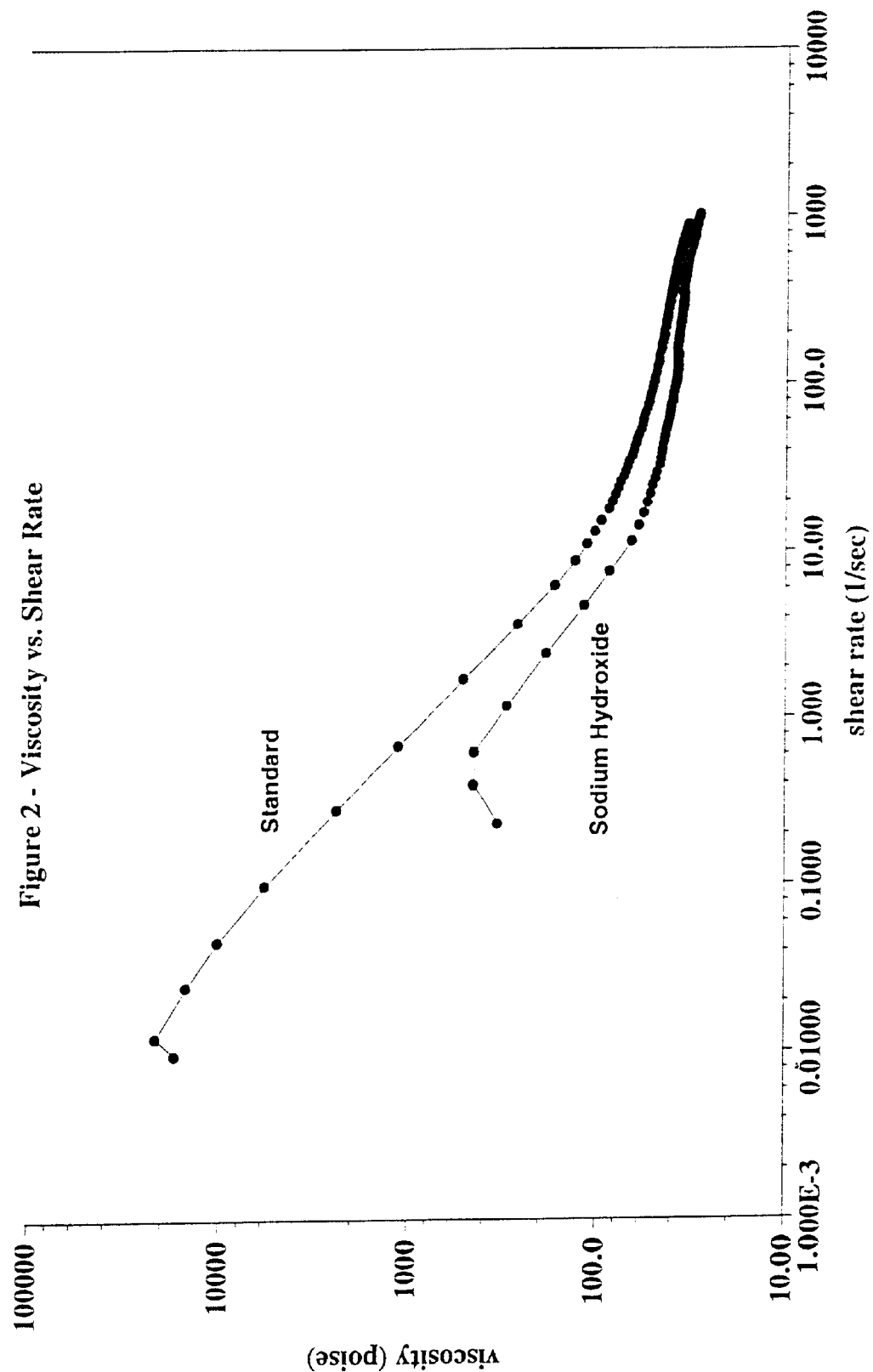

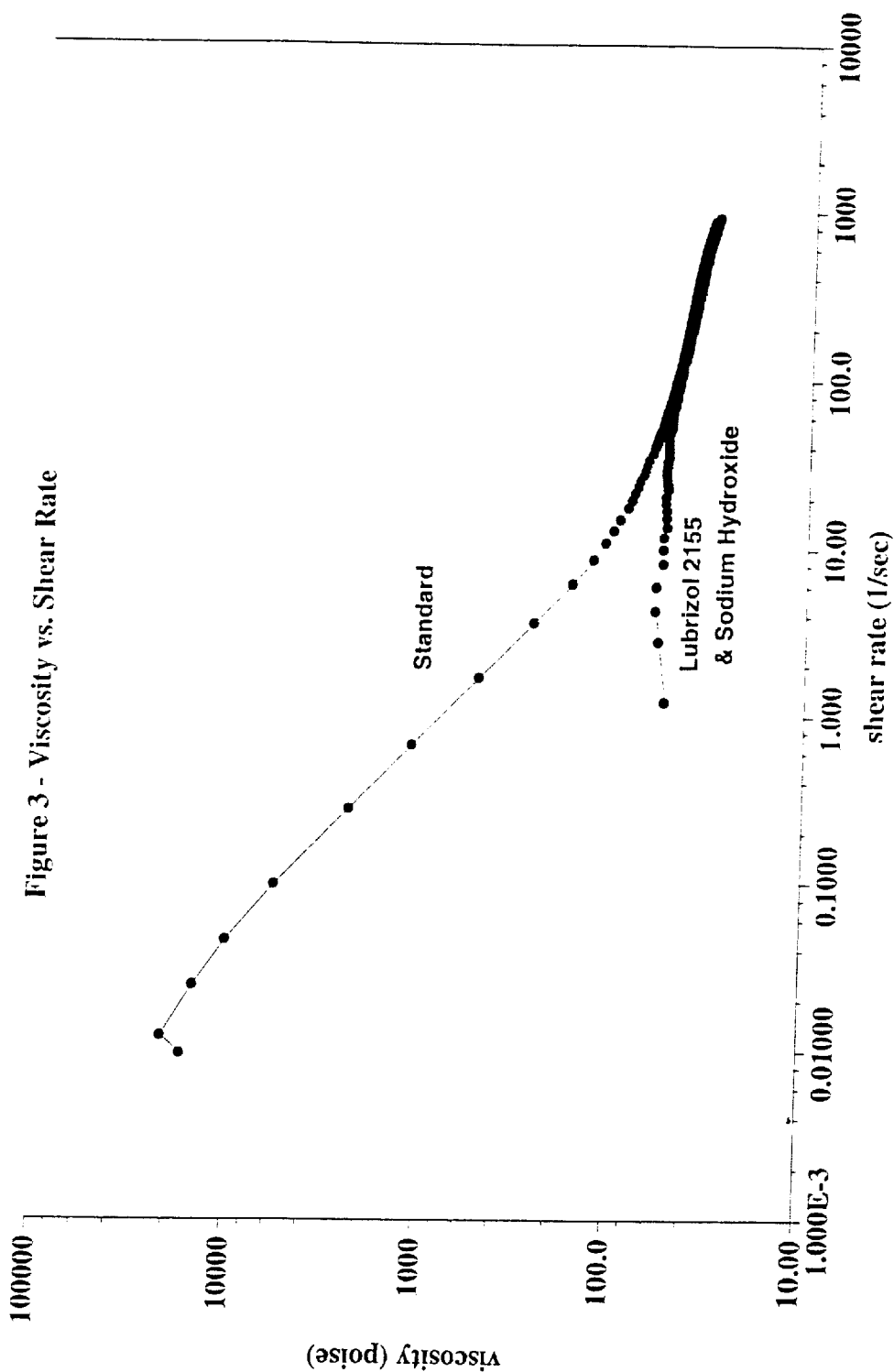

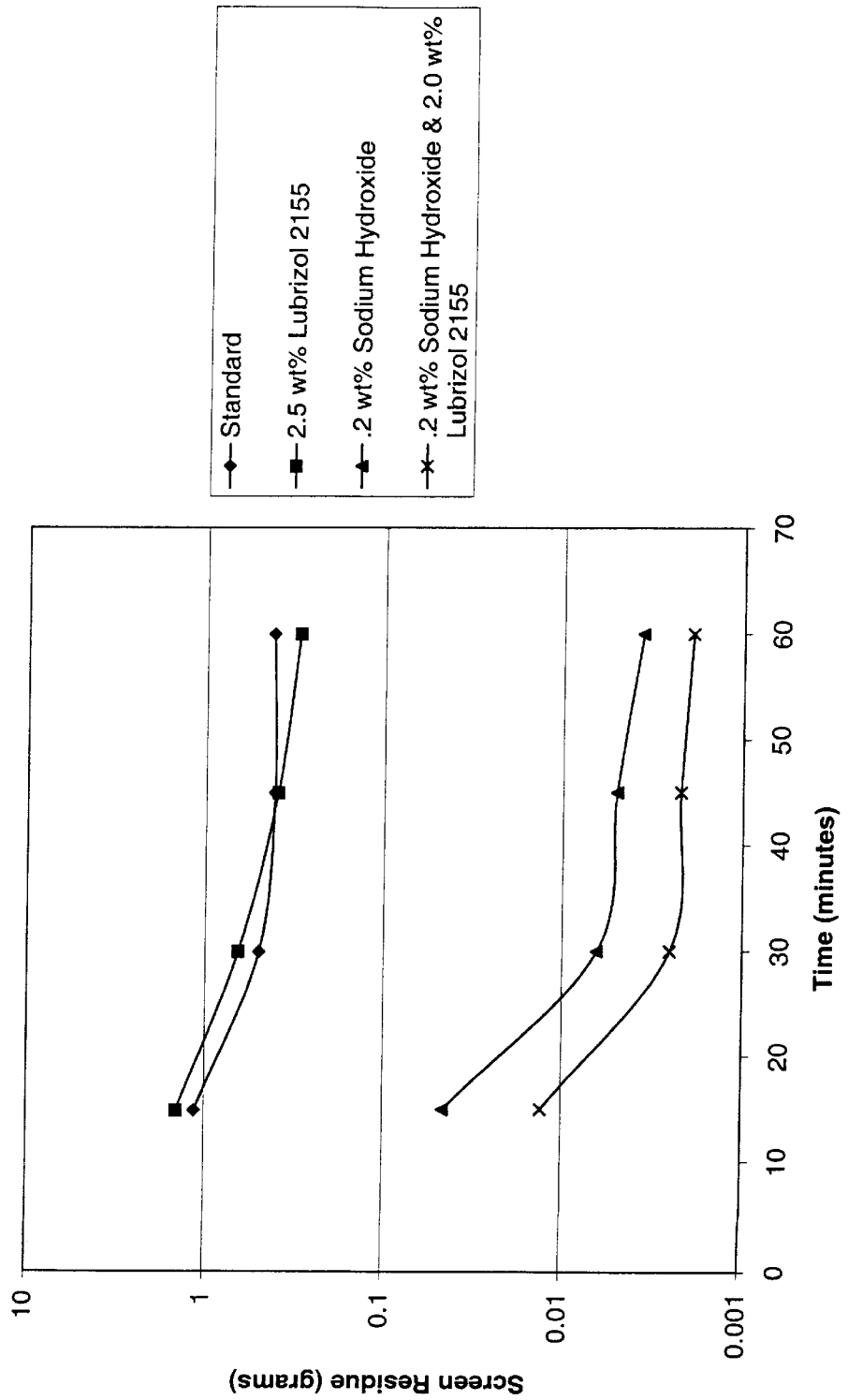

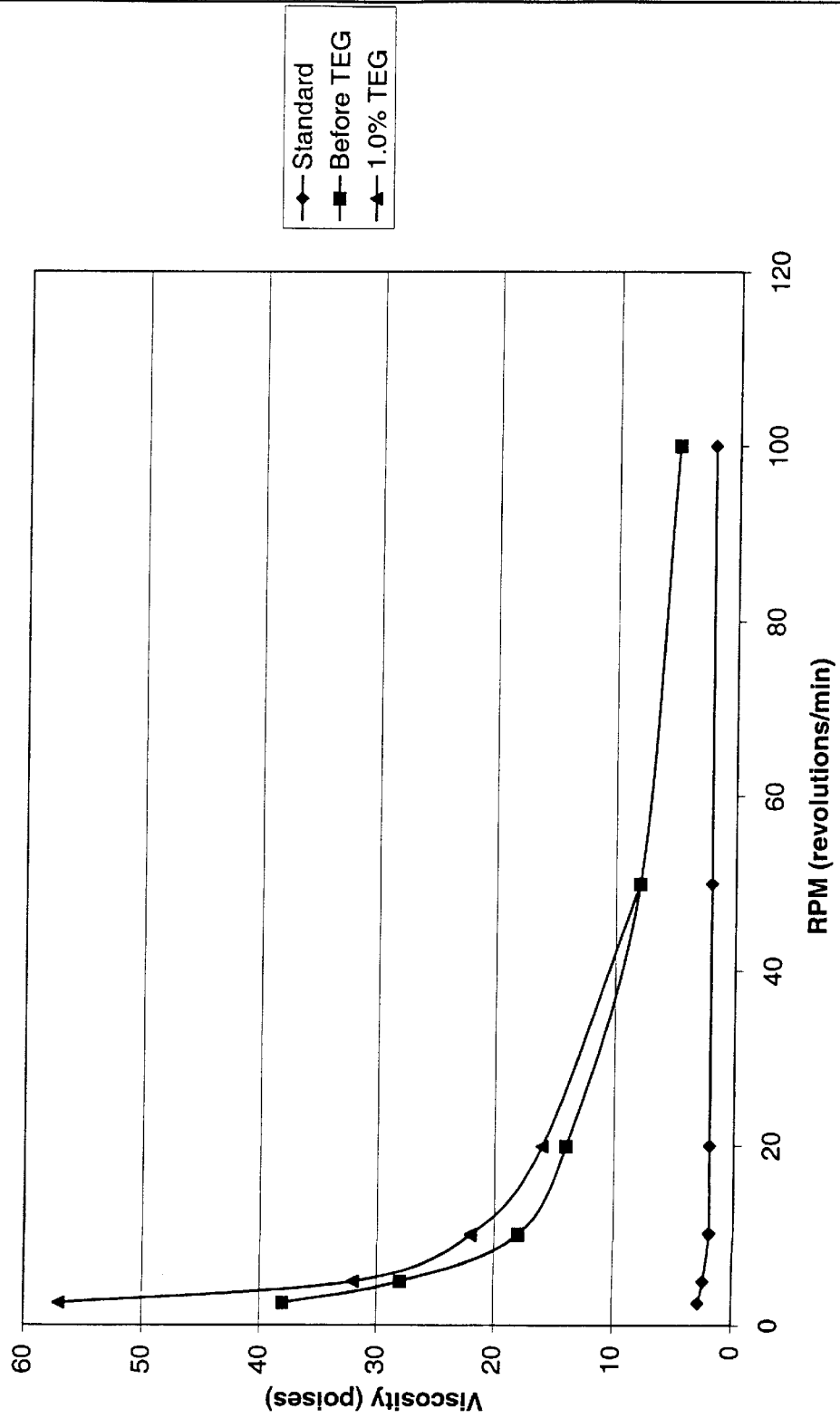

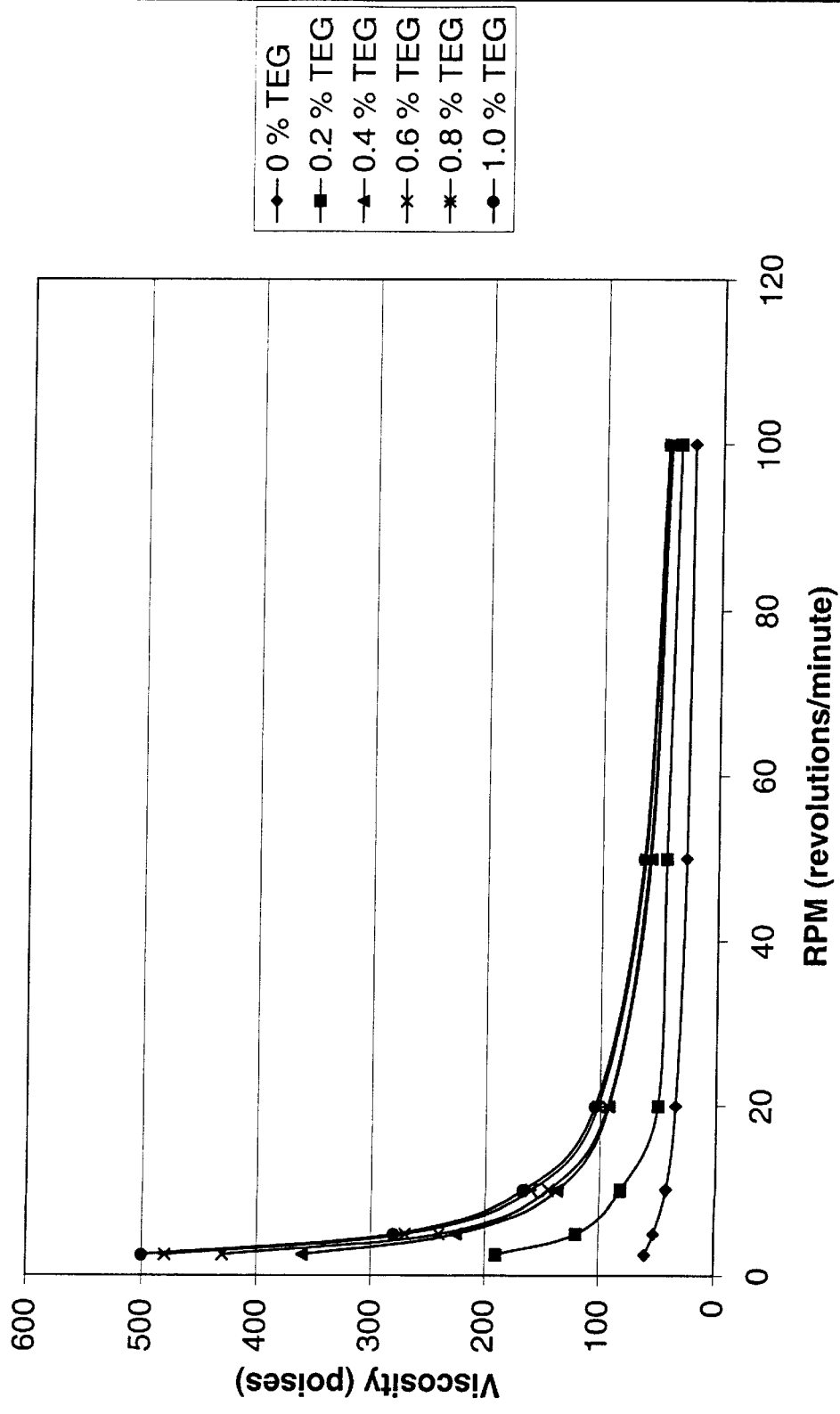

CARBON BLACK CONCENTRATES FOR NEWS INK

FIELD OF THE INVENTION

This invention relates to novel carbon black concentrates and news ink compositions and methods of preparing the same. The present invention also relates to a method of controlling the Theological properties of the inks so as to make them better suited for printing needs and to produce them more economically than before.

BACKGROUND OF THE INVENTION

News inks are prepared by mechanically dispersing carbon black in mineral oil. The oil serves as a vehicle for the carbon particles. The Theological properties of the dispersion are determined by the dispersion properties, and the concentration and the interaction of the oil and the carbon black. They are of great importance in the ultimate use of the ink.

When conventional furnace carbon blacks are dispersed in ordinary mineral oils to a concentration required for good printing, which usually is in the range of 10 to 20% by weight, the carbon particles tend to chain together to form a dispersion having undesirable thixotropic properties. This can be overcome by adding more oil to the dispersion, but it would ordinarily make the pigmentation too weak. It is customary, instead, to give the ink the required "length" by making use of a mineral oil containing resinous compounds or substances or asphaltic still bottoms rich in polar compounds, which will coat the carbon particles and reduce their tendency to chain together.

It is a common practice to use pigment concentrates in current manufacturing of printing inks. Thus, color inks are produced by the appropriate dilution of flushes containing between 25–40 wt. % of pigment. Similarly, black inks are made by letting down suitable bases containing 20 to 35 wt. % of carbon black.

The production of such concentrates allows for more efficient use of manufacturing equipment. It also offers an economical advantage when these concentrates are shipped to blending operations located out of town, or exported overseas. This is because the shipping costs per pound of finished ink can be proportionally reduced. Thus, there is a trend to produce concentrates with as high a pigment content as is practically feasible. However, the viscosity and consistency of concentrates increases very rapidly with an increase in pigment content. Although the application of heat can often assist the processing, it does not always lead to the most desirable results. For instance, during production of carbon black dispersions, generated heat during processing results in a highly structured, short mass which impairs the dispersion process and, thus, limits pigment loading. Further limitations in pigment content of concentrates are also imposed by the available production equipment for processing, and material handling considerations.

In the current state-of-the-art of news ink manufacturing, it is customary to produce dispersions of carbon black in a semi-continuous process consisting of premixing, shot milling, and letdown steps. The premix is conducted in high intensity mixing equipment at a relatively high pigment loading. The parameters of this step are designed to break up and deagglomerate pelletized carbon black. Resinous or polymeric additives are usually used to assist the wetting and dispersion of pigment. The most common additives are asphaltic still bottoms, gilsonite and hydrocarbon resins. These materials, although quite useful, offer limited help since they are effective only at a relatively low processing temperature. For example, at a temperature around 100° C., dispersion of carbon black exhibited poor flow characteristics, limiting the mass flow necessary for efficient mixing and shot milling. Conversely, at ambient temperature, they produce an excessive flow and require the use of rheological additives such as bentonite clays which are expensive and contribute to high cost. This phenomenon is caused by the solubility/temperature equilibrium of these additives in mineral oils. At ambient conditions, their affinity for carbon black dominates their behavior. Thus, they adsorb at the surface of carbon black, producing a relatively stable dispersion with a low, low shear viscosity. At elevated temperatures, due to increased solubility, they desorb and migrate into the bulk of the mineral oil, thus exposing the surface of particles to flocculation and the formation of a network of chains. This flocculated state produces structure and short body, impairing mixing and compounding.

U.S. Pat. No. 4,747,964, describes the use of alkenyl succinimides as components of dispersing additive compositions for lubricating oils. E. S. Forbes and E. L. Newstadter's publication in Tribology, (April 1972, pp. 72–77) elucidates the mechanics of the action of polyisobutylene succinimide in stabilizing the suspension of carbonaceous matter and prevent the formation of sludge in motor lubricating oils. Polyisobutylene succinimide was therefore described as exhibiting good adsorption affinity towards particulates of carbon black. The rational is that long chains of surfactant extended from the surface of particles sterically hinder flocculation and the formation of agglomerates.

Despite the separate use of either sodium hydroxide or alkenyl succinimide, the desired high pigment loading of up to 40% by weight carbon black concentration could not be achieved while maintaining good rheological properties. Furthermore, while the use of each of these compounds separately improves the overall characteristics of the carbon black concentrates in mineral oil and in the final lithographic ink, additional improvement are still required. The present invention makes use of an alkali metal hydroxide in combination with an alkenyl succinimide in order to achieve surprising synergistic effects with regard to improving the Theological properties of ink concentrates and allowing for an increase in the concentration of black carbon in these concentrates.

BRIEF DESCRIPTION OF THE DRAWINGS

FIG. 1 shows the effect of 0.2% of aqueous solution of sodium hydroxide on the viscosity profile (viscosity v shear rate) of a carbon black dispersion in mineral oil.

FIG. 2 shows the effect of 1.5% by weight of polyisobutylene succinimide (Lubrizol 2155) on the viscosity profile (viscosity v shear rate) of a carbon black dispersion in mineral oil.

FIG. 3 shows the effect of a combination of a 0.2% of aqueous solution of sodium hydroxide and 1.5% by weight of polyisobutylene succinimide (Lubrizol 2155) on the viscosity profile (viscosity v shear rate) of a carbon black dispersion in mineral oil.

FIG. 4 shows the effect of asphaltic still bottoms, polyisobutylene succinimide (Lubrizol 2155), sodium hydroxide, and a combination of Lubrizol 2155 and sodium hydroxide on the amount of undispersed carbon in a mineral oil dispersion after high speed mixing for various periods of time.

FIG. 5 shows the Brookfield viscosity v RPM of finished carbon black ink compositions without polyisobutylene succinimide (Lubrizol 2155), sodium hydroxide or TEG (std); with polyisobutylene succinimide (Lubrizol 2155) and sodium hydroxide but without TEG (before TEG addition); and with polyisobutylene succinimide (Lubrizol 2155), sodium hydroxide and 1% TEG.

FIG. 6 shows the effect of varying the TEG concentrations on the Brookfield viscosity of carbon black ink compositions containing polyisobutylene succinimide (Lubrizol 2155) and sodium hydroxide.

SUMMARY OF THE INVENTION

The present invention relates to carbon black printing ink compositions and concentrates thereof having good rheological properties. Specifically, the carbon black printing ink composition of the invention comprises an alkali metal hydroxide in combination with an alkenyl succinimide for the dispersion of the carbon black. The addition of TEG to the printing ink composition of the invention provides control over certain rheological properties.

Other objects and advantages of the present invention will become apparent from the following description and appended claims.

DETAILED DESCRIPTION OF THE INVENTION

It has now been found that the objectives of this invention are realized by employing an alkali metal hydroxide in combination with an alkenyl succinimide for the dispersion of carbon black in mineral oil. Preferably, the carbon black has a concentration of up to about 40% by weight of the mineral oil dispersion, more preferably from about 20 to 40% by weight, most preferably about 30 to 40% by weight of the total weight of the mineral oil dispersion.

Preferably, the alkali metal hydroxide is selected from the group consisting of sodium hydroxide, potassium hydroxide and lithium hydroxide. Most preferably, the alkali metal hydroxide is sodium hydroxide. Also preferably, the alkenyl succinimide is a $C_3$–$C_7$ succinimide. Most preferably it is polysibutylene succinimide.

The mineral oil dispersion of the present invention has a set of unique properties which include: (1) exceptionally good pigment dispersion with a higher tinctorial strength; (2) very good flow characteristics in a broad range of temperatures; (3) high pigment loading of up to 40 wt. %; and (4) ease of manufacturing, allowing for a high throughput rate.

When the above dispersion of the invention is converted to a finished lithographic ink with 18 wt. % of carbon black, it possesses the following characteristics: (1) Newtonian flow; and (2) the ability to have its rheological properties controlled through the addition of triethylene glycol (TEG) which is unique since conventional rheology control additives, due to the alkalinity of an ink, do not produce satisfactory results.

The conversion of the mineral oil dispersion to a finished lithographic ink is a typical manufacturing process that consists of premixing, shot milling and letdown of base of a finished ink. In production, often to facilitate shot milling, the premix is diluted with mineral oil to lower the viscosity. While the concentration of carbon black in the premix stage could be as high as 30% by weight, the shot milling is conducted at a 18–25% by weight level of carbon black. With the use of an alkali metal hydroxide/alkenyl succinimide combination, according to the present invention, dilution of the premix is not necessary.

In comparison to a standard ink produced in a conventional way without the use of the aforementioned additives, the ink showed superior performance in the following areas: (1) wider lithographic window; (2) faster clean-up during start up; (3) smoother lay of solids; (4) cleaner non-image areas; and (5) better rub-off of prints. The following is indicative of what performance in these areas is understood to be for the purpose of this invention.

Smoother Lay

This smoother lay is related to the appearance of the print solid area. It can be assessed visually or instrumentally with an optical scanner. Fundamentally, it is related to film thickness uniformity on a print, and it is governed by the physico-chemical properties of an ink. A non-uniform film shows variations in optical density which, at some point, can be visually or instrumentally detected. The ink of the present invention has a more uniform density when compared to the ink of the prior art, and therefore has better lay.

Faster Clean-up

This term is related to the number of waste copies that are discarded during the start-up, before a good, saleable copy is produced in a press printing run. The initial copy count is an important parameter, since it contributes significantly to the total waste paper cost.

Wider Lithographic Window

This term is used to define performance flexibility of lithographic inks. It points to a range of water settings within which an ink holds constant print density (not more than 0.1 unit drop). A wide water window is more desirable, since inks with this property are more forgiving and easier to run on the press. The ink of the present invention has very similar densities at a very broad water setting range. Hence, it has a wide water window. In contrast, the standard ink (without the alkali metal hydroxide/alkenyl succinimide combination) had a rather narrow water window.

Cleaner Non-image Area

Lithographic printing plates contain a hydrophobic image area that accepts ink and a hydrophilic, non-image area which accepts water and should reject ink. In reality, however, minute quantities of ink are emulsified into the water and are deposited in the non-image area, staining it to various degrees. This phenomenon is not desirable and depends on a number of factors, including that of the physico-chemical properties of ink. Test runs conducted with inks formulated according to this invention indicate excellent lithographic characteristics and a very clean non-image area.

Rub-off of Prints

According to the current state-of-art, news inks do not completely dry in post-printing time. Thus, they exhibit a tendency to transfer to any surface that comes into contact with the newspaper (including the hands of a reader). The rub-off depends on many factors that, among others, includes the pigment dispersion quality (rub-off is improved with dispersion quality), rheology of inks (more fluid inks show better rub-off), and lithographic qualities (lithographically superior inks have better rub-off).

EXAMPLE 1

Preparation of News Inks

Preparation of all base samples was carried out according to the following procedure: A one liter stainless steel beaker, equipped with a variable speed stirrer and 65 mm Meyer type blade, was placed on a hot plate. After adding quantities of mineral oil, aqueous solution (50%) of NaOH and polyisobutylene succinimide (Lubrizol 2155), the temperature of the mixture was increased to 100° C. while mixing. At this temperature, carbon black was added gradually, and the speed of mixing was set at 4000 rpm. Mixing was continued for 45 minutes. For the purpose of process step identification, this procedure was called "premixing". After premixing was finished, the charge was passed through the shot mill at a temperature of 70–75° C. After short milling, the base sample was diluted to a finished ink. Standard inks were produced with a similar procedure, except sodium hydroxide and polyisobutylene succinimide were omitted. In their place, asphaltic stillbottoms was used.

EXAMPLE 2

A standard dispersion of HAF, a high structure carbon black in 750 SUS mineral oil and containing asphaltic still bottoms was prepared. The dispersion was divided into four equal portions. Portion #1 remained as is, and was marked Standard. To portion #2, 0.2 wt. % of aqueous solution of sodium hydroxide was added. To portion #3, 1.5 wt. % of polyisobutylene succinimide (Lubrizol 2155) was added, and to portion #4 a combination of both additives in the concentrations indicated above was added. All samples were then mixed for 20 minutes and left to stand for one hour. The viscosity versus shear rate of all samples was measured with a Carri-Med rheometer using a 2°, 4 cm cone sensor and temperature controlled plate set at 25° C.

The results in the form of viscosity profiles (viscosity v shear rate) are shown in FIGS. 1–3. The superior effect of the combined additives (sodium hydroxide/polyisobutylene succinimide) on flow properties of the dispersion is clearly indicated since the viscosity remained fairly constantly low as the shear rate varied (FIG. 3).

EXAMPLE 3

A dispersion of carbon black was made with high speed mixing for a period of one hour in the presence and absence of certain additives. The compositions of these dispersions are listed in Table I.

TABLE I

| Dispersion | #1 | #2 | #3 | #4 |
|---|---|---|---|---|
| S.J. 2400 Mineral Oil | 72.5 | 72.5 | 69.8 | 57.8 |
| Carbon Black (Low Structure) | 25.0 | 25.0 | 30.0 | 40.0 |
| Asphaltic Still Bottoms | 2.5 | — | — | — |
| PIBSA | — | 2.5 | — | 2.0 |
| Aqueous Solution (NaOH 50%) | — | — | .4 | .4 |
|  | 100.00 | 100.00 | 100.00 | 100.00 |

During mixing, samples were collected at 15 minute intervals, and undispersed carbon black was determined with the #325 screen washout test. In the test, 10 g samples were diluted and mixed with hydrocarbon solvent (naphtha) and then passed through the #325 screen. Particles of pigment larger than 44 μm that were retained on the screen were dried in the oven and weighed. The results are shown in FIG. 4 which clearly demonstrate the superior dispersion quality of the sodium hydroxide/polyisobutylene succinimide combination.

The concentration of carbon black in dispersions #1 and #2 could not be increased above 25 wt. % since, at a temperature around 100° C., they stopped mixing properly (the mass did not follow the blade due to increasing structure with increasing temperature). Due to the effect of NaOH in dispersions #3 and #4, the black concentration could be increased since it remained fluid at a temperature of 100° C. and higher. When the combination of NaOH and polyisobutylene succinimide was used, the dispersion not only remained fluid at higher temperature, but was also of a low viscosity allowing for an increased pigment loading.

EXAMPLE 4

After mixing for one hour, dispersions #1 and #4 of Example 3 were passed through a shot mill and let down with mineral oils to a finished ink containing 18 wt. % of carbon black. The composition of inks is shown in Table II.

TABLE II

| | Composition of Inks | | |
|---|---|---|---|
| Inks | #1 | #2 | #3 |
| Dispersion #1 | 72 | — | — |
| Dispersion #4 | — | 45 | 45 |
| 2400 Mineral Oil | — | 23 | 23 |
| 750 Mineral Oil | 28 | 31 | 31 |
| TEG | — | 1 | |
| | 100 | 100 | 100 |

FIG. 5 shows the Brookfield viscosity of inks. It can be seen that Ink #2 possessed nearly newtonian behavior in that the viscosity remained the same throughout the range of the RPM's tested. Such a property of an ink is unacceptable for printing presses, since the ink can drip from an ink fountain anytime the press stops and it will mist excessively during high speed printing. Hence, to control the flow, a rheological additive is necessary. It was discovered that TEG, when used in small amounts as shown in ink composition #3, imparts the desired ink structure but does not negatively affect other important properties of an ink.

EXAMPLE 5

The effect of TEG on Brookfield viscosity, when added to printing ink#3 of Example 4 at various concentrations, is depicted in FIG. 6. Other materials tested were ineffective or they produced negative side effects which were unsatisfactory for overall performance quality of the ink. For example, Table IV lists % increase in Brookfield viscosity at 2.5 RPM as compared to 1 wt. % of TEG.

TABLE III

| Material | Amount Used | % Increase v. 1 wt. % TEG |
|---|---|---|
| Glycerol | 1 | 36 |
| Water | 1 | 25 |
|  | 2 | 30 |
|  | 3 | 31 |
| Fatty acids C$_9$ | 1 | 41.6 |
| Fatty acids C$_{12}$ | 1 | 28 |
| C$_{14}$ | 1 | 25 |
| C$_{16}$ | 1 | 23 |
| C$_{18}$ | 1 | 21 |
| TOFA* | 1 | 18 |

*Tall Oil Fatty Acids

The effect of other glycols in comparison with scosity increase is shown in Table IV.

TABLE IV

| Revolutions per Minute (RPM) | Ethylene | Di-Ethylene | Tri-Ethylene | Propylene | Di-Propylene | Tri-Propylene |
|---|---|---|---|---|---|---|
| 2.5 | 300 | 390 | 380 | 340 | 280 | 140 |
| 5 | 180 | 225 | 225 | 190 | 170 | 105 |
| 10 | 115 | 135 | 137.5 | 115 | 105 | 75 |
| 20 | 77.5 | 85 | 92 | 77.5 | 97 | 52.5 |
| 50 | 51 | 50 | 58 | 45 | 48 | 36 |
| 100 | 37.5 | 35.5 | 44.5 | 31 | 36 | 29 |

Based on the results of Tables II and IV, TEG (triethyleneglycol) appears to have additional unique effects on the Theological properties of the printing ink of the invention.

The invention has been described in terms of preferred embodiments thereof, but is more broadly applicable as will be understood by those skilled in the art. The scope of the invention is only limited by the following claims.

What is claimed is:

1. A printing ink composition comprising:
   (a) carbon black; and
   (b) an alkali metal hydroxide in combination with an alkenyl succinimide for the dispersion of the carbon black.

2. The printing ink composition of claim 1, wherein the alkali metal hydroxide is selected from the group consisting of sodium hydroxide, potassium hydroxide and lithium hydroxide.

3. The printing ink composition of claim 1, wherein the alkenyl succinimide is polyisobutylene succinimide.

4. The printing ink composition of claim 1 further containing tri-ethylene glycerol.

5. In a printing ink composition, the improvement which comprises adding:
   (a) carbon black; and
   (b) an alkali metal hydroxide in combination with an alkenyl succinimide for the dispersion of the carbon black.

6. The printing ink composition of claim 5, wherein the alkali metal hydroxide is selected from the group consisting of sodium hydroxide, potassium hydroxide and lithium hydroxide.

7. The printing ink composition of claim 5, wherein the alkenyl succinimide is polyisobutylene succinimide.

8. The printing ink composition of claim 5 further containing tri-ethylene glycerol.

9. The printing ink composition of claim 5, wherein the carbon black is initially dispersed in mineral oil in a concentration of up to 40% by weight.

10. The printing ink composition of claim 5, wherein the carbon black is initially dispersed in mineral oil in a concentration ranging from about 20% to 40% by weight.

11. A method of preparing a carbon black printing ink composition which comprises dispersing the carbon black in a mineral oil in the presence of an alkali metal hydroxide and an alkenyl succinimide.

12. The method of claim 11, wherein the alkali metal hydroxide is selected from the group consisting of sodium hydroxide, potassium hydroxide and lithium hydroxide.

13. The method of claim 11, wherein the alkenyl succinimide is polyisobutylene succinimide.

14. The method of claim 11, wherein the carbon black printing ink composition contains tri-ethylene glycerol.

15. The method of claim 11, wherein the carbon black is initially dispersed in mineral oil in a concentration of up to 40% by weight.

16. The method of claim 11, wherein the carbon black is initially dispersed in mineral oil in a concentration ranging from about 20% to 40% by weight.

17. A mineral oil composition comprising carbon black, an alkali metal hydroxide and an alkenyl succinimide.

18. The mineral oil composition of claim 17, wherein the alkali metal hydroxide is selected from the group consisting of sodium hydroxide, potassium hydroxide and lithium hydroxide.

19. The mineral oil composition of claim 17, wherein the alkenyl succinimide is polyisobutylene succinimide.

20. The mineral oil composition of claim 17, wherein the carbon black has a concentration of up to 40% by weight.

21. The mineral oil composition of claim 17, wherein the carbon black has a concentration ranging from about 20% to 40% by weight.

* * * * *

UNITED STATES PATENT AND TRADEMARK OFFICE
CERTIFICATE OF CORRECTION

PATENT NO. : 6,187,085 B1
DATED : February 13, 2001
INVENTOR(S) : Olgierd Wasilewski It is certified that error appears in the above-identified patent and that said Letters Patent is hereby corrected as shown below:

Figure 5,
In the legend Standard should read -- (Before TEG) Ink #2 --;
  Before TEG should read -- (Standard) Ink #1 --;
  1.0%TEG should read -- (1.0% TEG) Ink #3 --.

Column 1,
Line 8, "Theological" should read -- reological --;
Line 15, "Theological" should read -- reological --.

Column 2,
Line 21, "Newstadter's" should read -- Neustrader's --;
Line 42, "Theological" should read -- reological --.
Line 48, "FIG. 1" should read -- FIG. 2 --;
Line 51, "FIG. 2" should read -- FIG. 1 --;

Column 6,
Line 32, "Ink#2" should read -- Ink #3 --;
Line 39, "#3" should read -- #2 --;
Line 66, "scosity" should read -- viscosity --.

Column 7,
Line 16, "Theological" should read -- reological --.

Claim 4,
Line 36, "glycerol" should read -- glycol --.

UNITED STATES PATENT AND TRADEMARK OFFICE
CERTIFICATE OF CORRECTION

PATENT NO.    : 6,187,085 B1
DATED         : February 13, 2001
INVENTOR(S)   : Olgierd Wasilewski It is certified that error appears in the above-identified patent and that said Letters Patent is hereby corrected as shown below:

Claim 8,
Line 50, "glycerol" should read -- glycol --.

Claim 14,
Line 29, "glycerol" should read -- glycol --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*